(12) United States Patent
Tamura (10) Patent No.: US 12,459,837 B2
(45) Date of Patent: Nov. 4, 2025

(54) LIQUID ACTIVATION APPARATUS

(71) Applicants: Tamura Co., Ltd., Tokyo (JP); Ryo Tamura, Tokyo (JP)

(72) Inventor: Kikuo Tamura, Fukushima (JP)

(73) Assignee: Tamura Co., Ltd., Tokyo (JP)

(*) Notice: Subject to any disclaimer, the term of this patent is extended or adjusted under 35 U.S.C. 154(b) by 356 days.

(21) Appl. No.: 18/273,243

(22) PCT Filed: Jan. 25, 2022

(86) PCT No.: PCT/JP2022/002635
§ 371 (c)(1),
(2) Date: Jul. 19, 2023

(87) PCT Pub. No.: WO2022/163641
PCT Pub. Date: Aug. 4, 2022

(65) Prior Publication Data
US 2024/0109793 A1    Apr. 4, 2024

(30) Foreign Application Priority Data
Feb. 1, 2021 (JP) ................................. 2021-014187

(51) Int. Cl.
C02F 1/00 (2023.01)
C02F 1/30 (2023.01)
C02F 1/48 (2023.01)

(52) U.S. Cl.
CPC ............... *C02F 1/30* (2013.01); *C02F 1/005* (2013.01); *C02F 1/48* (2013.01)

(58) Field of Classification Search
CPC .... C02F 1/005; C02F 1/30; C02F 1/48; C02F 2303/04
See application file for complete search history.

(56) References Cited

U.S. PATENT DOCUMENTS

| 4,501,661 A | 2/1985 | Karasawa |
| 2004/0026307 A1 | 2/2004 | Tamura |
| 2009/0101564 A1 | 4/2009 | Tamura |

FOREIGN PATENT DOCUMENTS

| JP | H09136083 A | * 5/1997 |
| JP | 200473901 A | 3/2004 |

(Continued)

OTHER PUBLICATIONS

Tada Mitsuhiro—JP H9-136083 Fit translation—May 27, 1997 (Year: 1997).*

(Continued)

*Primary Examiner* — Bradley R Spies
(74) *Attorney, Agent, or Firm* — Erise IP, P.A.

(57) ABSTRACT

The present invention provides a liquid activation apparatus capable of generating a liquid that can maintain a high active power for a long period of time. A water activation apparatus 1 as a liquid activation apparatus has an electrically conductive inner cylindrical body 20, an electrically conductive inlet connecting pipe 23 connected to the inner cylindrical body 20, an electrically conductive outlet connecting pipe 24 connected to the inner cylindrical body 20, an electrically conductive outer cylindrical body 22 disposed outside of the inner cylindrical body 20 and being electrically isolated from the inner cylindrical body 20, the inlet connecting pipe 23, and the outlet connecting pipe 24, a corrugated pipe 51 disposed inside of the inner cylindrical body 20, a honeycomb mesh portion 52 disposed inside of the corrugated pipe 51, and a plurality of liquid activation ball members 53 filled radially inward of the honeycomb mesh portion 52. Each of the liquid activation ball members includes a ball case 55 having a closed-shell cavity structure and a ball housed within the ball case 55. The ball 56 contains one or more types of functional minerals capable of emitting an ion (Continued)

beam, a magnetic beam, a far infrared ray, or a trace of radiation.

9 Claims, 11 Drawing Sheets

(56) References Cited

FOREIGN PATENT DOCUMENTS

| | | |
|---|---|---|
| JP | 2005-288385 A | 10/2005 |
| JP | 5236945 B2 | 7/2013 |
| WO | 2009/125451 A1 | 10/2009 |

OTHER PUBLICATIONS

PCT Patent Application No. PCT/JP2022/002635 International Search Report and Written Opinion Apr. 5, 2022.

* cited by examiner

LIQUID ACTIVATION APPARATUS

RELATED APPLICATIONS

The present application is a national stage application under 35 U.S.C. § 371 of PCT Patent Application No. PCT/JP2022/002635, filed 25 Jan. 2022, which claims priority to Japanese Patent Application No. 2021-014187, filed 1 Feb. 2021. The above-referenced applications are hereby incorporated by reference in their entirety.

TECHNICAL FIELD

The present invention relates to a liquid activation apparatus, and more particularly to a liquid activation apparatus for bringing water or oil into a so-called activated state.

BACKGROUND ART

Ground water produced from rain or snow in a mountainous region that has permeated into the ground eventually becomes spring water and forms headstreams of rivers. During this process, hydrogen bond aggregates (clusters) of water molecules are subdivided by far-infrared rays, negative ion effects, or magnetic effects from minerals and rocks. Alternatively, the water receives electrons generated by friction between water molecules, which is caused by collision against rocks or waterfall. Thus, the water becomes reductive. Such reductive water is referred to as "activated water" or "activation water" and has widely been discussed as water having some specific functions.

It has been difficult to say that such activation water is scientifically proved or publicly recognized. In fact, however, advantageous changes or responses are seen empirically, but somewhat widely, when such activation water is used as process water or additive water for specific components or as drinking water.

For example, there have been known water activation devices using water activation pieces with spiral channels for obtaining such activated water (see, e.g., Patent Literature 1). Water can be brought into an activated state with such conventional water activation devices. Nevertheless, there has been demand for technology capable of maintaining activated water having a higher active power for a longer period of time. There also has been demand for technology capable of activating liquids other than water.

PRIOR ART LITERATURE

Patent Literature

Patent Literature 1: JP 5236945 B

SUMMARY OF THE INVENTION

Problem(s) to be Solved by the Invention

The present invention has been made in view of the above drawbacks in the prior art. It is, therefore, an object of the present invention to provide a liquid activation apparatus capable of generating a liquid that can maintain a high active power for a long period of time.

Means for Solving Problem(s)

According to an aspect of the present invention, there is provided a liquid activation apparatus capable of generating a liquid that can maintain a high active power for a long period of time. The liquid activation apparatus has an electrically conductive inner cylindrical body, an electrically conductive inlet connecting pipe having an inlet port formed therein, the inlet connecting pipe being connected to the inner cylindrical body, an electrically conductive outlet connecting pipe having an outlet port formed therein, the outlet connecting pipe being connected to the inner cylindrical body, an electrically conductive outer cylindrical body disposed outside of the inner cylindrical body, the outer cylindrical body being electrically isolated from the inner cylindrical body, the inlet connecting pipe, and the outlet connecting pipe, a corrugated pipe disposed inside of the inner cylindrical body, a honeycomb mesh portion disposed inside of the corrugated pipe, and a plurality of liquid activation ball members filled radially inward of the honeycomb mesh portion. Each of the plurality of liquid activation ball members includes a case having a closed-shell cavity structure and a ball housed within the case, the ball containing one or more types of functional minerals capable of emitting an ion beam, a magnetic beam, a far infrared ray, or a trace of radiation.

MODE(S) FOR CARRYING OUT THE INVENTION

Embodiments of a liquid activation apparatus according to the present invention will be described in detail below with reference to FIGS. 1 to 11. In FIGS. 1 to 11, the same or corresponding components are denoted by the same or corresponding reference numerals and will not be described below repetitively. Furthermore, in FIGS. 1 to 11, the scales or dimensions of components may be exaggerated, or some components may be omitted. Unless mentioned otherwise, in the following description, terms such as "first," "second," etc. are only used to distinguish one component from another and are not used to indicate a specific order or a specific sequence.

Figure 1:
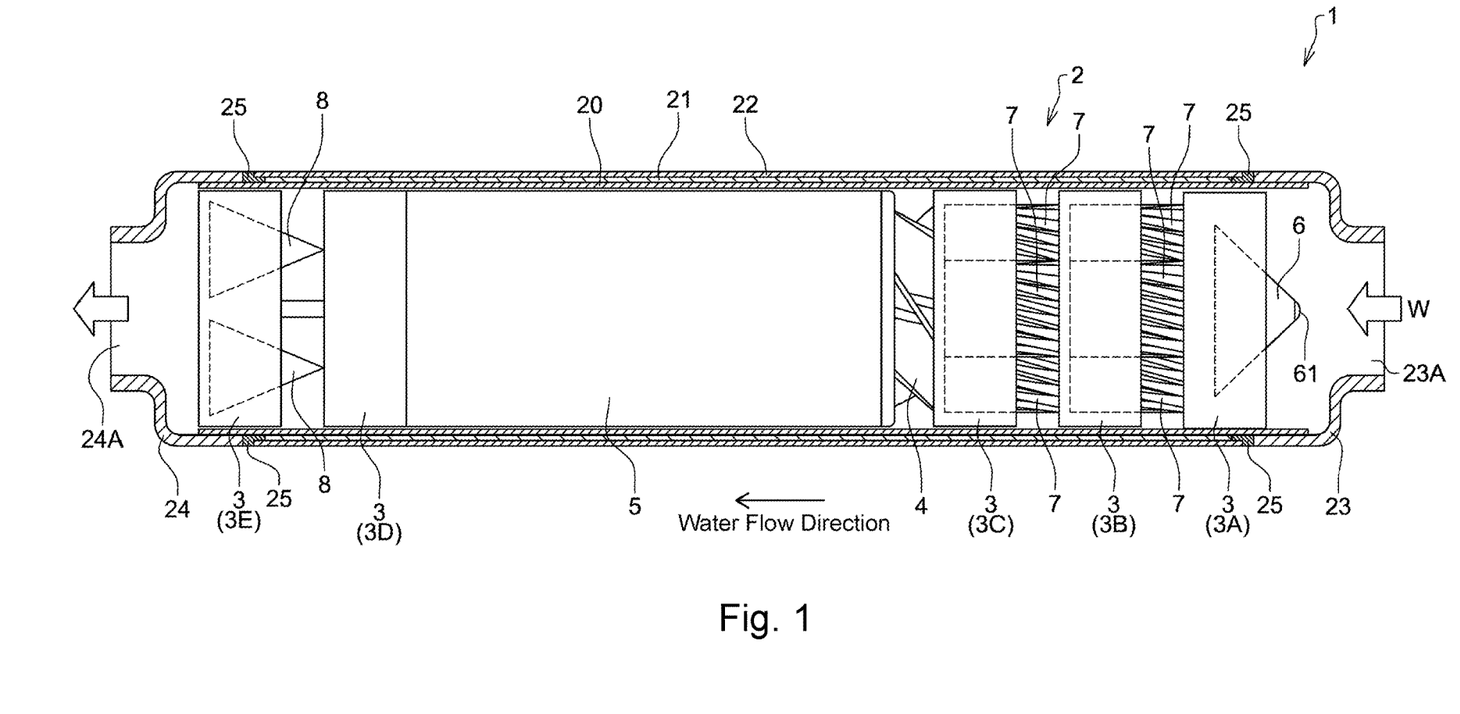
FIG. 1 is a partially cross-sectional side view schematically showing a water activation apparatus as a liquid activation apparatus according to an embodiment of the present invention.

FIG. 1 is a partially cross-sectional side view schematically showing a water activation apparatus 1 as a liquid activation apparatus according to an embodiment of the present invention. As shown in FIG. 1, the water activation apparatus 1 has a housing 2 substantially in the form of a cylinder, a plurality of holders 3 (3A-3E) arranged along a water flow direction in an internal space of the housing 2, a vane member 4, and a water activation module 5. For example, the water activation apparatus 1 is coupled in series or in parallel to a water conduction pipe (not shown) of tap water, treated water, or sewage and buried in the ground, or alternatively coupled to a midway of a distributing water pipe (not shown) in a building. Unless otherwise mentioned, a direction in which water flows is referred to herein as "downstream," and a direction opposite thereto is referred to as "upstream."

The housing 2 includes an electrically conductive inner cylindrical body 20 formed of metal, for example, an insulator 21 that covers substantially the overall outer circumferential surface of the inner cylindrical body 20, an electrically conductive outer cylindrical body 22 that covers an outer circumference of the insulator 21, an inlet connecting pipe 23 connected to the inner cylindrical body 20 so as to cover an opening portion on an upstream end of the inner cylindrical body 20, an outlet connecting pipe 24 connected to the inner cylindrical body 20 so as to cover an opening portion on a downstream end of the inner cylindrical body 20. The outlet connecting pipes 23 and 24 are formed of an electrically conductive material, and the insulator 21 is formed of a material having electrical insulation properties.

An opened end of the inlet connecting pipe 23, which is connected to the inner cylindrical body 20, forms an inlet port 23A into which water flows. An opened end of the outlet connecting pipe 24, which is connected to the inner cylindrical body 20, forms an outlet port 24A from which water that has passed through the housing 2 flows. Thread grooves (not shown) are formed in inner circumferential surfaces of the inlet port 23A and the outlet port 24A so that the inlet port 23A and the outlet port 24A are screwed to the aforementioned water conduction pipe or distributing water pipe. Thus, the connecting pipes 23 and 24 are coupled to the aforementioned water conduction pipe or distributing water pipe in a sealed state with screw connection. In the present embodiment, the inlet port 23A of the inlet connecting pipe 23 and the outlet port 24A of the outlet connecting pipe 24 are located on a common straight line or a common curved line to reduce a pressure loss when water flows through the apparatus.

Insulation rings 25 having electrical insulation properties are disposed between the respective connecting pipes 23 and 24 and opposite ends of the outer cylindrical body 22. Thus, the connecting pipes 23 and 24 are electrically insulated from the outer cylindrical body 22. An earth terminal (not shown) is connected to the outer cylindrical body 22, so that positive charges produced on the outer cylindrical body 22 are grounded (earthed). When the water activation apparatus 1 is buried in the ground, such an earth terminal can be omitted.

Figure 2:
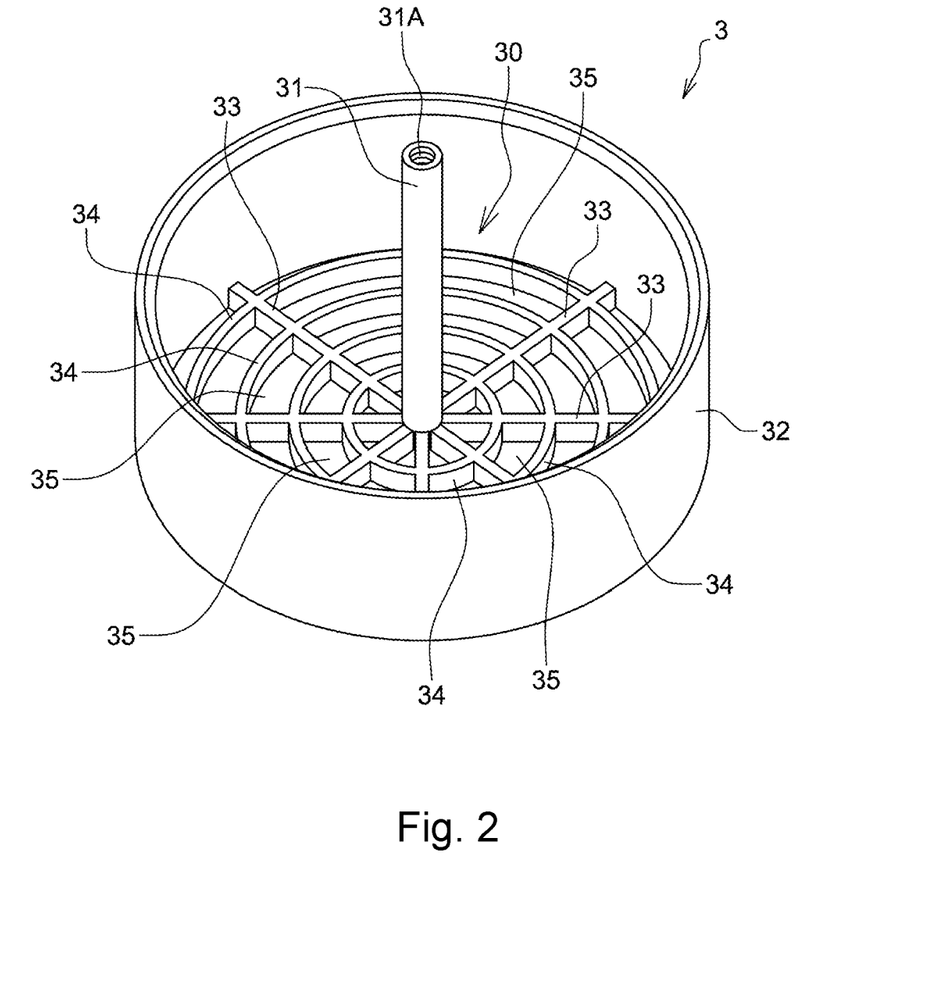
FIG. 2 is a perspective view schematically showing a holder in the water activation apparatus illustrated in FIG. 1.

FIG. 2 is a perspective view schematically showing the holder 3. For example, the holder 3 is formed of a resin. The shape of the holder 3 is sized to substantially fit an inner circumferential surface of the aforementioned inner cylindrical body 20. Thus, a plurality of holders 3 can coaxially be arranged in an internal space of the inner cylindrical body 20 with multiple stages. Any number of holders 3 can be included in the water activation apparatus 1 in consideration of a flow rate of water, an efficiency of water activation, and the like.

As shown in FIG. 2, the holder 3 includes a holding portion 30 formed in a reticulated manner, a connecting shaft 31 extending from a central portion of the holding portion 30 in a direction perpendicular to the holding portion 30, and a circumferential wall 32 extending in a cylindrical manner from an outer peripheral edge of the holding portion 30 so as to surround the holding portion 30. In this example, a height of the connecting shaft 31 as measured from the holding portion 30 is greater than a height of the circumferential wall 32 as measured from the holding portion 30. An end of the circumferential wall 32 is tapered.

The connecting shaft 31 of the holder 3 has an end that can be fitted into an adjacent holder 3. Thus, the holder 3 can be fitted coaxially to an adjacent holder 3, so that the holders 3 can be connected to each other with multiple stages in an axial direction. In the present embodiment, as shown in FIG. 1, the first-stage holder 3A holds an upstream conical canopy 6, and each of the second-stage holder 3B and the third-stage holder 3C holds one or more cylindrical water activation members 7. The fourth-stage holder 3D holds an end of the water activation module 5, and the fifth-stage holder 3E holds one or more downstream conical canopies 8.

As shown in FIG. 2, the holding portion 30 of the holder 3 has a plurality of radial ribs 33 extending radially from the connecting shaft 31 to the circumferential wall 32 and a plurality of concentric ribs 34 connecting between the radial ribs 33 in a circumferential direction. The radial ribs 33 and the concentric ribs 34 form a large number of water flow holes 35 that allow water to pass therethrough in the entire surface of the holding portion 30. Although not illustrated in FIG. 2, the radial ribs 33 and the concentric ribs 34 have inclined surfaces to swirl water to generate turbulence when the water passes through the water flow holes 35. The arrangement and number of the radial ribs 33 and the concentric ribs 34 are not limited to the illustrated example.

Figure 3:
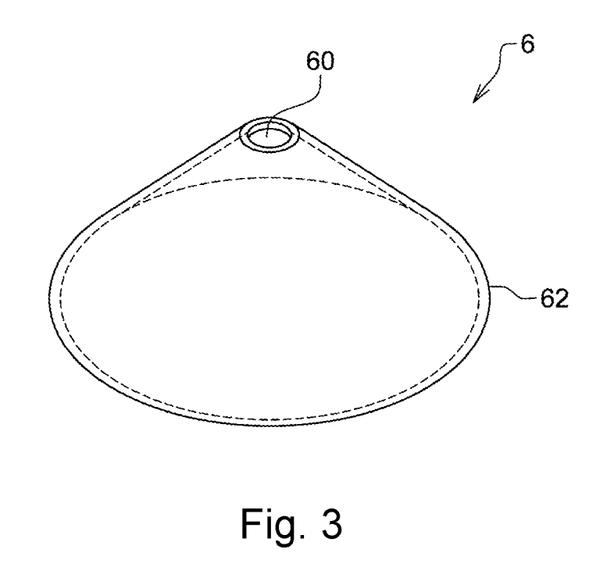
FIG. 3 is a perspective view schematically showing an upstream canopy in the water activation apparatus illustrated in FIG. 1.

FIG. 3 is a perspective view schematically showing the upstream canopy 6 held by the first-stage holder 3A. As shown in FIG. 3, a screw hole 6A is formed at the apex of the upstream conical canopy 6. A screw 61 (see FIG. 1) is inserted to the screw hole 60 of the upstream canopy 6 and screwed to a threaded groove 31A (see FIG. 2) formed at an end of the connecting shaft 31 of the holder 3A. Thus, the upstream canopy 6 is fixed to the holder 3A. The upstream canopy 6 has an apex angle of about 90 degrees. An edge 62 of a foot of the upstream canopy 6 has a diameter that is approximately the same as a diameter of the outermost concentric rib 34 of the holder 3A. In this manner, the upstream canopy 6 is held in the holder 3A in a state in which the foot of the upstream canopy 6 spreads from an upstream side to a downstream side.

The upstream canopy 6 of the present embodiment is formed of a titanium alloy. A titanium alloy exhibits catalysis, can kill *Escherichia coli*, *Legionella pneumophilia*, and the like, suppress proliferation of bacteria, and ionize chlorine to detoxify water when it is brought into contact with tap water.

Figure 4:
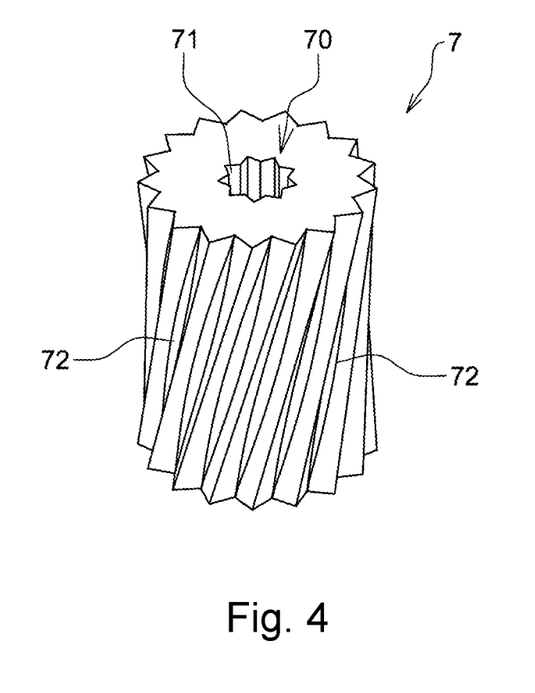
FIG. 4 is a perspective view schematically showing a water activation member in the water activation apparatus illustrated in FIG. 1.

FIG. 4 is a perspective view schematically showing one of the water activation members 7, which are held by the second-stage and third-stage holders 3B and 3C. The water activation members 7 are formed of a cylindrical burnt body primarily containing one or more functional minerals having physical properties of emitting ion beams, magnetic beams, far infrared rays, or a trace of various kinds of radiations. Examples of such a functional mineral include ceramic, black silica (graphite silica), obsidian, maifan stone, tourmaline, and the like.

A through hole 70 is formed along the central axis in the water activation member 7. Spiral grooves 71 extending spirally in the axial direction are formed in an inner surface of the through hole 70. Additionally, spiral grooves 72 extending spirally in the axial direction are formed in an outer surface of the water activation member 7. Those spiral grooves 71 and 72 substantially increase a surface area of the water activation member 7 to increase an area of the water activation member 7 that is brought into contact with flowing water. Furthermore, water flowing to the water activation member 7 produces swirling flows when it passes through the spiral grooves 71 and 72. In this embodiment, the spiral grooves 71 and 72 are formed in a continuous manner in the circumferential direction. Nevertheless, such spiral grooves may be formed only partially in the circumferential direction.

The water activation member 7 has a height that is slightly lower than a height of the connecting shaft 31 of the holder 3. The water activation member 7 has a diameter that is about a half of a radius of the holding portion 30 of the holder 3. Furthermore, the size of through hole 70 of the water activation member 7 is slightly greater than an outside diameter of the connecting shaft 31 of the holder 3.

Figure 5:
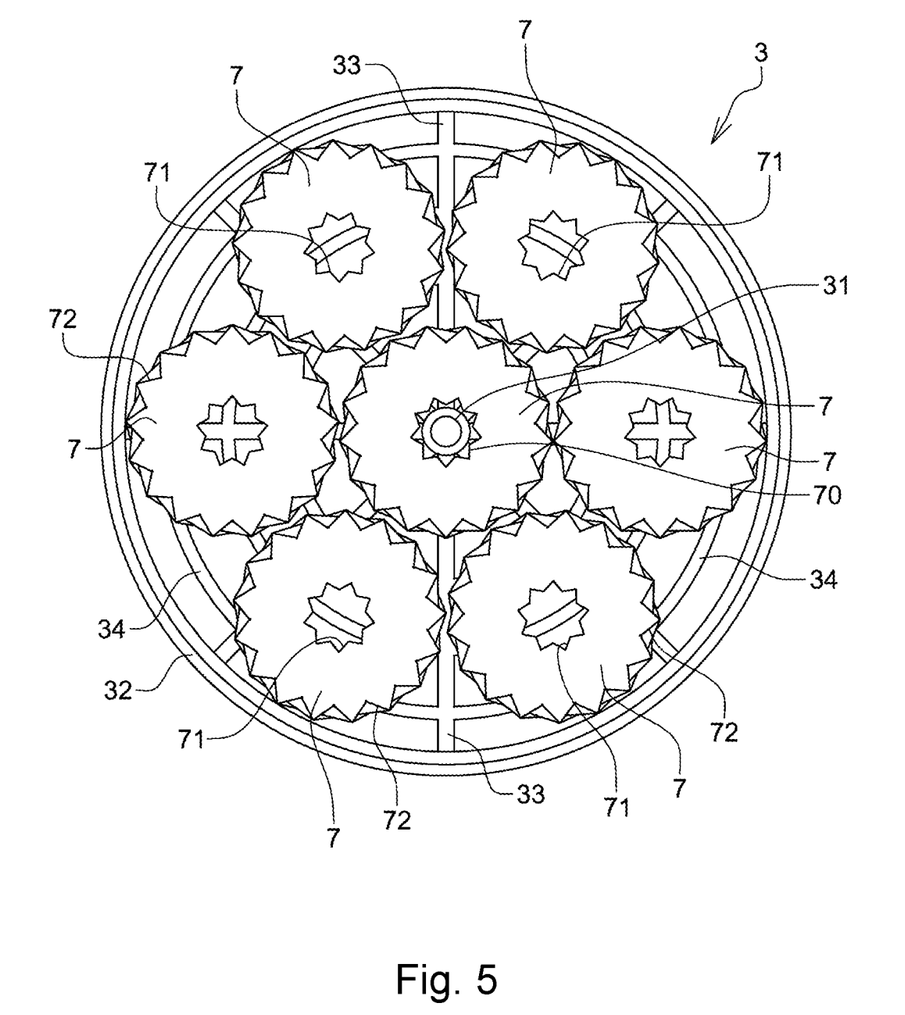
FIG. 5 is a plan view schematically showing an arrangement of the water activation members held by the holder shown in FIG. 2.

FIG. 5 is a plan view schematically showing an arrangement of the water activation members 7 held by the holder 3. As shown in FIG. 5, in this embodiment, seven water activation members 7 are held by one holder 3. The connecting shaft 31 of the holder 3 is inserted to the through hole 70 of one water activation member 7 so that the water activation member 7 is arranged centrally in the holder 3. Around this water activation member 7, six water activation members 7 are arranged inside of the circumferential wall 32 of the holder 3 equidistantly in the circumferential direction without contacting each other.

This arrangement of the water activation members 7 allows the flowing water to be brought into contact with the surfaces of the water activation members 7 uniformly and also allows the water activation members 7 to rotate about their own axes with forces applied from the water flowing through the aforementioned spiral grooves 71 and 72. Additionally, the aforementioned functional mineral can apply ion beams, magnetic beams, far infrared rays, or a trace of various kinds of radiations to water that is brought into contact with the water activation members 7. Thus, water activation can be performed more effectively.

Figure 6:
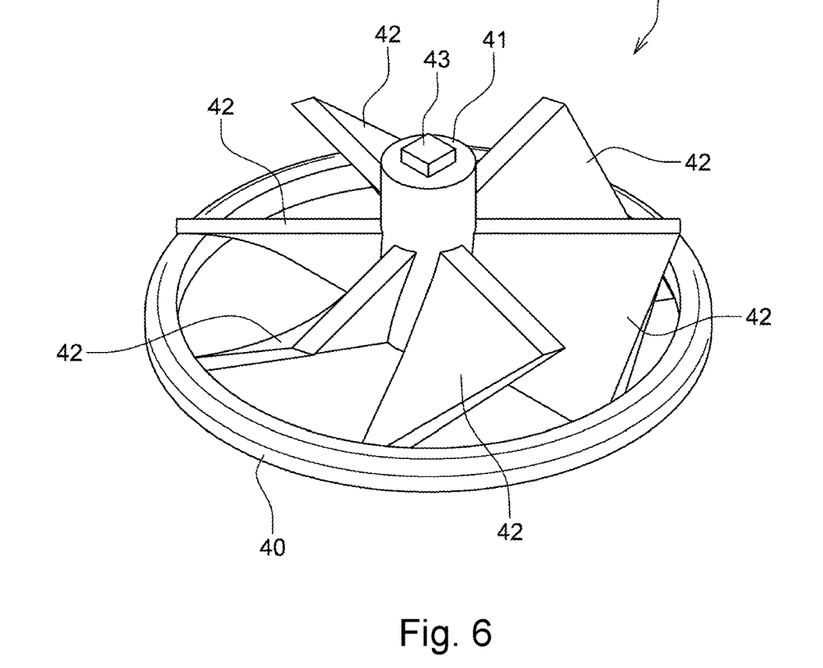
FIG. 6 is a perspective view schematically showing a swirl vane in the water activation apparatus illustrated in FIG. 1.

FIG. 6 is a perspective view schematically showing the vane member 4. As shown in FIG. 6, the vane member 4 includes a ring portion 40 extending in an annular manner, a shaft portion 41 located at the center of the ring portion 40 with a predetermined length, and a plurality of swirl vanes 42 extending radially from the shaft portion 41 toward the ring portion 40. Six swirl vanes 42 are arranged equidistantly in the circumferential direction. Each of the swirl vanes 42 has a three-dimensional curved surface twisted so as to cause swirling flows to water flowing in the axial direction. In the present embodiment, only one vane member 4 is provided in the water activation apparatus 1. Nevertheless, a plurality of vane members 4 may be arranged in the water activation apparatus 1.

The vane member 4 has a projection 43 formed with a rectangular cross-section at the top of the shaft portion 41. The projection 43 can fit a recess (not shown) formed in a bottom of the connecting shaft 31 of the holder 3C. Thus, the vane member 4 is connected to the holder 3C by the projection 43. Therefore, the vane member 4 can be prevented from rotating about its axis due to reaction of swirling forces applied to the water flow by the swirl vanes 42. Therefore, the velocity energy of the water flow can be prevented from being consumed by rotation of the vane member 4.

It is preferable to form the vane member 4 by molding a mixture of a pulverized or grained functional mineral having physical properties of emitting ion beams, magnetic beams, far infrared rays, or a trace of various kinds of radiations and a resin material. Examples of such a functional mineral include ceramic, black silica (graphite silica), obsidian, maifan stone, tourmaline, and the like. A functional mineral mixed to a resin material is not limited to one type of mineral. Two or more types of functional minerals may be mixed and used in consideration of a liquid to be treated or a capacity of treatment. When water is brought into contact with the vane member 4 formed of the aforementioned material, then ion beams, magnetic beams, far infrared rays, or a trace of various kinds of radiations can be applied to the water. Thus, water activation can be performed more effectively. For example, nylon, urethane, silicon, or the like may be used for the resin material.

Figure 7:
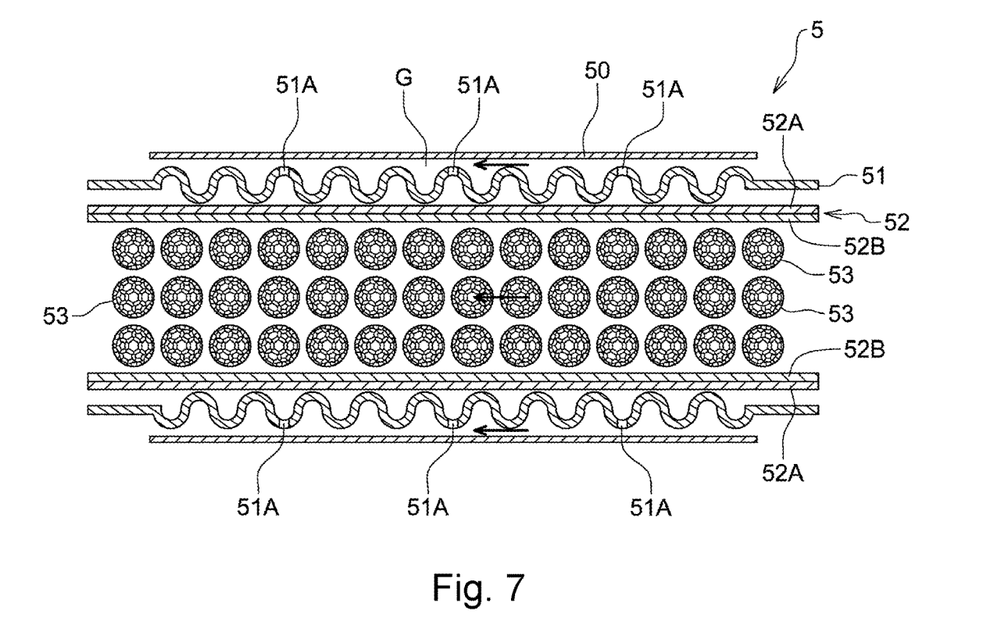
FIG. 7 is a cross-sectional view schematically showing an arrangement of a water activation module in the water activation apparatus illustrated in FIG. 1.

FIG. 7 is a cross-sectional view schematically showing an arrangement of the water activation module 5. As shown in FIG. 7, the water activation module 5 includes an outer pipe 50 formed of, for example, a resin, a corrugated pipe 51 housed inside of the outer pipe 50, a cylindrical honeycomb mesh portion 52 arranged on an inner side of the corrugated pipe 51, and a plurality of water activation ball members 53 (liquid activation ball members) filled in a radially inner space of the honeycomb mesh portion 52. As with vane member 4, it is preferable to form the corrugated pipe 51 of a mixture of the aforementioned pulverized or grained functional mineral and a resin material.

The corrugated pipe 51 has cylindrical portions on opposite ends thereof. On an inner surface and an outer surface of a portion of the corrugated pipe 51 that is located inside of the outer pipe 50, irregularities are repetitively formed with certain intervals along the axial direction. Such irregularities can disturb a flow along the inner surface and the outer surface of the corrugated pipe 51 into a turbulence state and stir the flow. Thus, an opportunity for the water activation module 5 to contact water molecules can be increased, so that water activation is further promoted. Such irregularities may be formed on only one of the inner surface and the outer surface of the corrugated pipe 51. Nevertheless, it is preferable to form irregularities on both of the inner surface and the outer surface of the corrugated pipe 51 in order to achieve a more active stirring state.

A clearance G is formed between the outer surface of the corrugated pipe 51 and an inner circumferential surface of the outer pipe 50. Water flows through the clearance G in the water flow direction. The corrugated pipe 51 has liquid passage holes 51A formed at a plurality of locations in the axial direction. The liquid passage holes 51A communicate between an inner side and an outer side of the corrugated pipe 51. Thus, water communicates between the inner side and the outer side of the corrugated pipe 51 through the liquid passage holes 51A. Therefore, a wide range of movement and stirring of water can be implemented. The shape, locations, and number of the liquid passage holes 51A are selected in consideration of the viscosity, flow rate, flow velocity, and the like of flowing water.

Figure 8A:
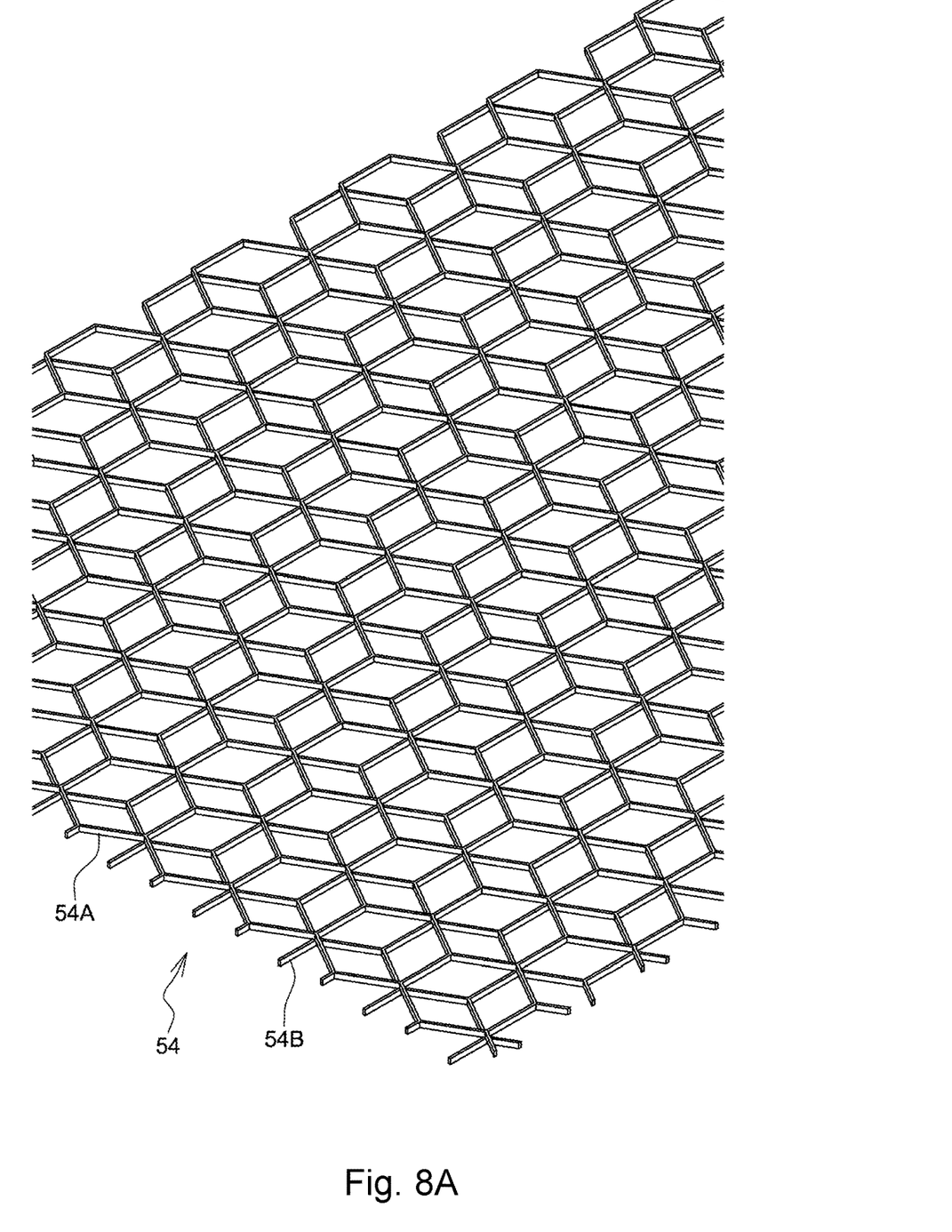
FIG. 8A is a perspective view schematically showing a mesh member forming a honeycomb mesh portion of the water activation module illustrated in FIG. 7.

The honeycomb mesh portion 52 is formed of a cylindrical member having two mesh layers 52A and 52B and is obtainable by forming a mesh member 54 as illustrated in FIG. 8A into a cylindrical shape. The honeycomb mesh portion 52 may have a shape close to a cylinder and does not need to be a closed cylinder.

Figure 8B:
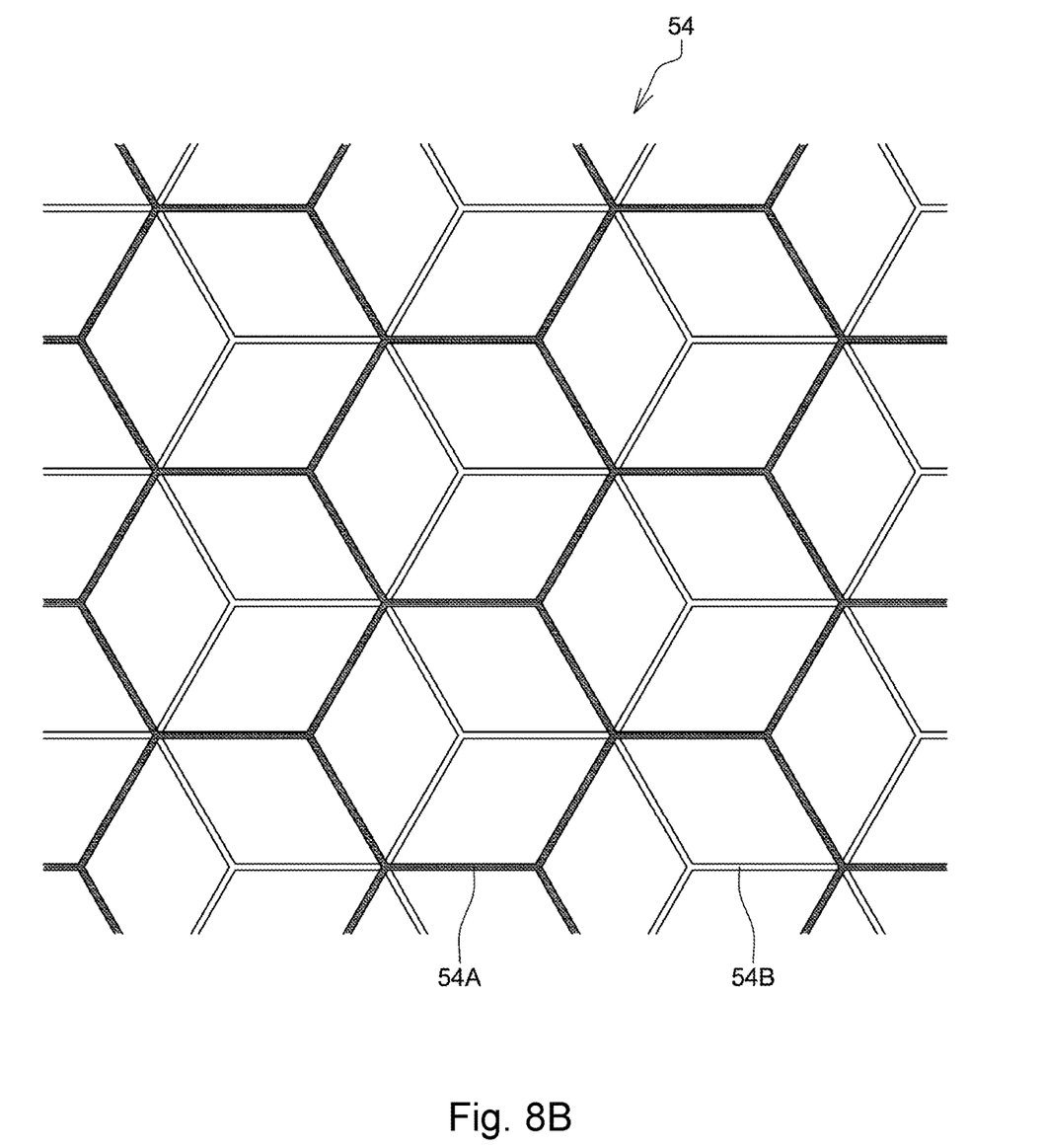
FIG. 8B is an enlarged partial plan view of the mesh member illustrated in FIG. 8A.

FIG. 8B is an enlarged partial plan view of the mesh member 54 to form the honeycomb mesh portion 52. As shown in FIGS. 8A and 8B, the mesh member 54 is formed of a resin, for example. The mesh member 54 is formed by bonding a first mesh layer 54A, which has a honeycomb structure in which a number of hexagonal openings are continuously formed, and a second mesh layer 54B, which has a honeycomb structure in which a number of hexagonal openings are continuously formed as with the first mesh layer 54A, in a stacked state. In FIG. 8B, to facilitate understanding, the first mesh layer 54A is illustrated as being hatched. In FIG. 8B, the center of each of the hexagons in the honeycomb structure of the second mesh layer 54B is located at a vertex of one of the hexagons in the honeycomb structure of the first mesh layer 54A. Thus, the honeycomb structure (first honeycomb structure) of the first mesh layer 54A and the honeycomb structure (second honeycomb structure) of the second mesh layer 54B are arranged in offset positions so as not to overlap with each other in the plan view.

Use of the honeycomb mesh portion 52 formed of the mesh member 54 allows movement of water flowing through the water activation module 5 to change from vortexes to waves. Therefore, potential capabilities of water are likely to be recovered within the water activation module 5.

Figure 9:
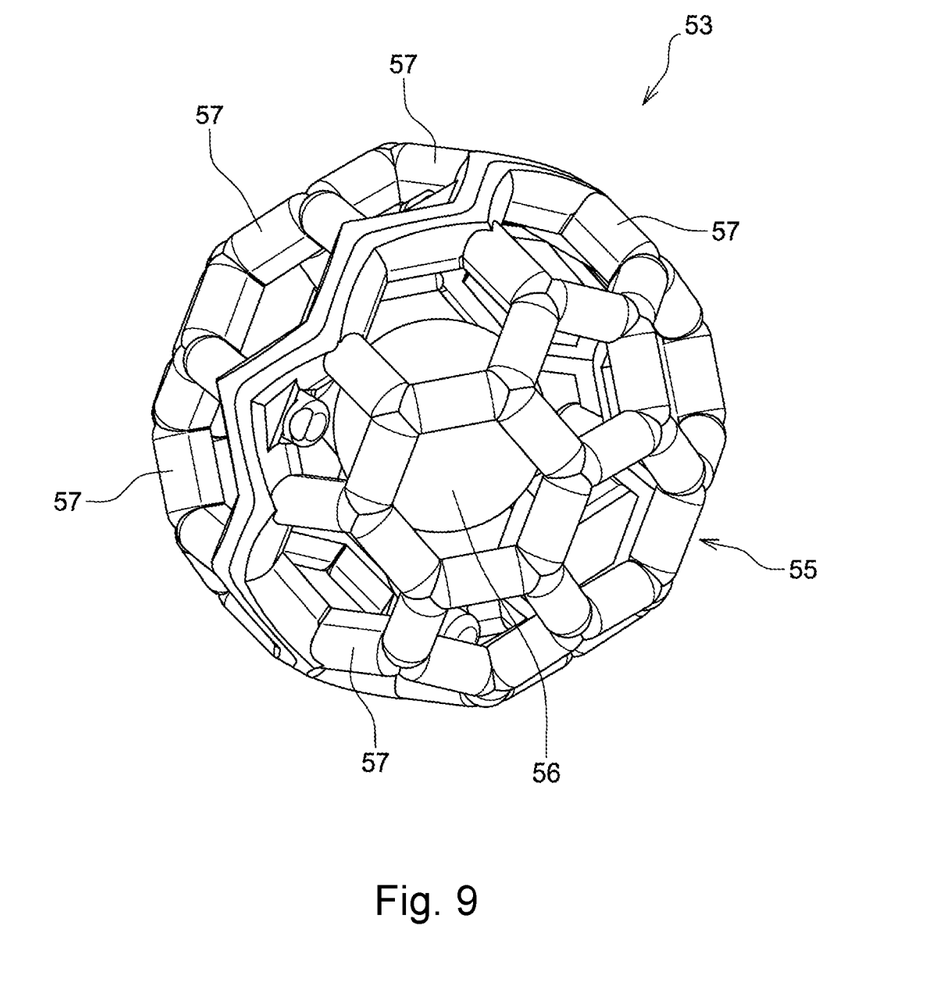
FIG. 9 is a perspective view schematically showing the water activation ball member of the water activation module illustrated in FIG. 7.

FIG. 9 is a perspective view schematically showing the water activation ball member 53. As shown in FIG. 9, the water activation ball member 53 includes a ball case 55 having an open-shell cavity structure and a ball 56 housed in a movable manner within the ball case 55. For example, the ball case 55 is formed of a resin. The ball 56 includes one or more types of functional minerals having physical properties of emitting ion beams, magnetic beams, far infrared rays, or a trace of various kinds of radiations. Examples of such a functional mineral include ceramic, black silica (graphite silica), obsidian, maifan stone, tourmaline, and the like.

The ball case 55 of the present embodiment has a closed-shell cavity structure, which includes joint portions 57 forming respective sides of a truncated icosahedron, and allows water to enter an interior of the ball case 55. Thus, water is allowed to enter the interior of the ball case 55 and contact the ball 56 housed within the ball case 55, so that ion beams, magnetic beams, far infrared rays, or a trace of various kinds of radiations can be applied to the water by the aforementioned functional mineral. Thus, water activation can be performed more effectively.

Figure 10:
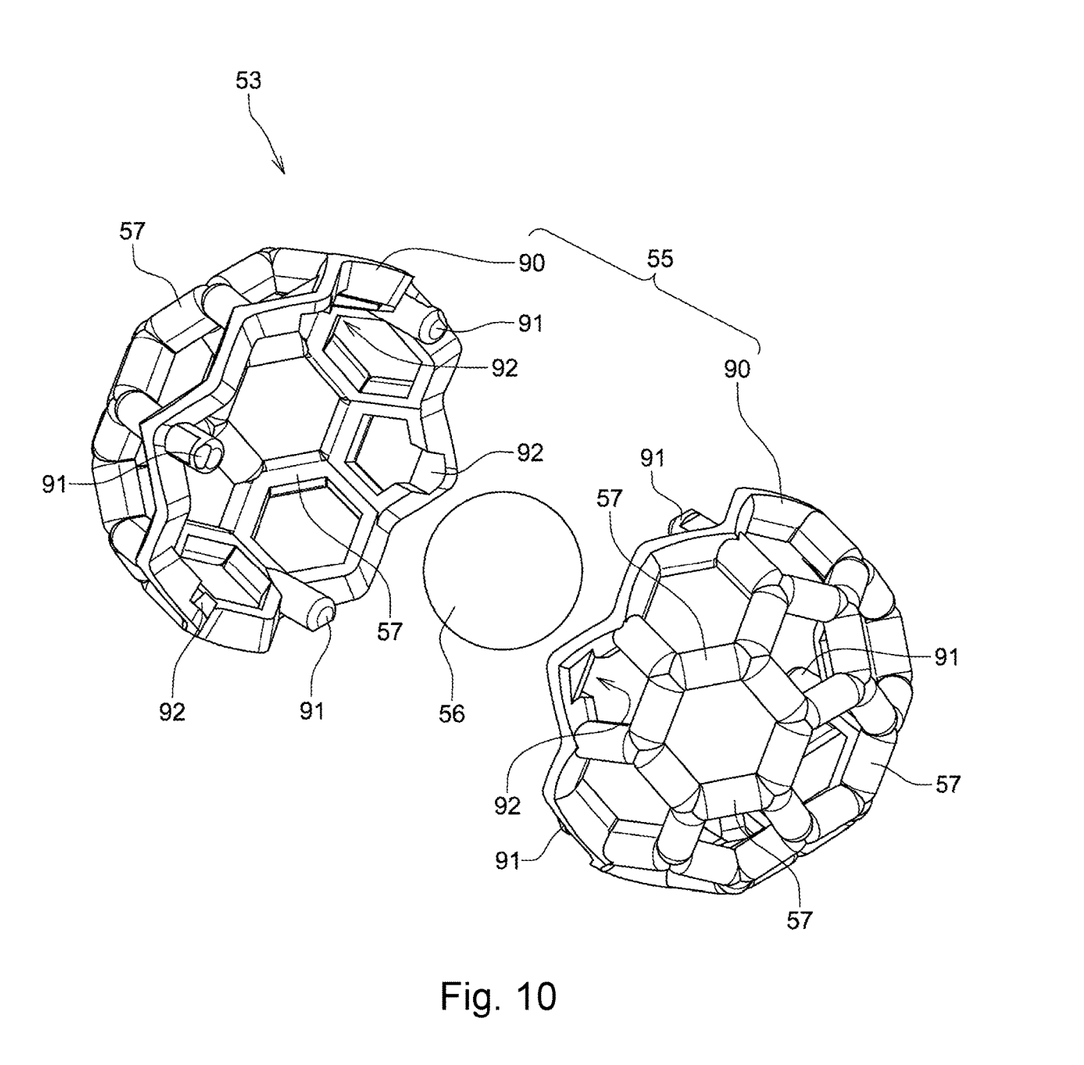
FIG. 10 is an exploded perspective view of the water activation ball member illustrated in FIG. 9.

As shown in FIG. 10, the ball case 55 is comprised of two case parts 90 having the same structure. Each of the case parts 90 has three projections 91 projecting toward the other case part 90 and three projection receivers 92 that receive projections 91 of the other case part 90. The projections 91 of each of the case parts 90 are arranged with intervals of 120 degrees in the circumferential direction, and the projection receivers 92 are also arranged with intervals of 120 degrees in the circumferential direction. Each of the projection receivers 92 is located in the middle of the two projections 91. Therefore, when the two case parts 90 are shifted from each other by 60 degrees, the projections 91 of one of the case parts 90 can be received into the projection receivers 92 of the other case part 90. Thus, the two case parts 90 are coupled to each other to form the ball case 55. The shape of the ball case 55 is not limited to the illustrated example. The ball case 55 may have any structure as long as it has a closed-shell cavity structure.

Figure 11:
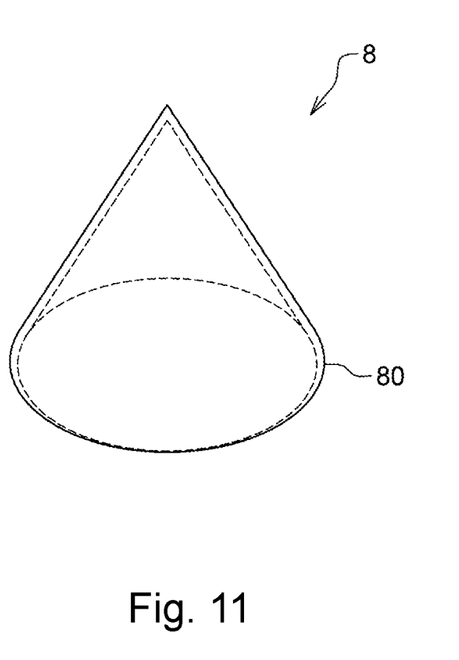
FIG. 11 is a perspective view schematically showing a downstream canopy in the water activation apparatus illustrated in FIG. 1.

FIG. 11 is a perspective view schematically showing the downstream canopy 8 held by the fifth-stage holder E. As shown in FIG. 11, the conical downstream canopy 8 has an apex angle of about 45 degrees. The downstream canopies 8 are arranged within the holder 3E such that an edge 80 of a foot of the downstream canopy 8 is held in contact with the holding portion 30 of the holder 3E. Thus, each of the downstream canopies 8 is held in the holder 3E in a state such that the foot of the downstream canopy 8 spreads from an upstream side to a downstream side. In the present embodiment, four downstream canopies 8 are arranged inside of the circumferential wall 32 of the holder 3E equidistantly in the circumferential direction about the connecting shaft 31 of the holder 3E without contacting each other.

The downstream canopy 8 of the present embodiment is formed of a titanium alloy. A titanium alloy exhibits catalysis, can kill *Escherichia coli, Legionella pneumophilia*, and the like, suppress proliferation of bacteria, and ionize chlorine to detoxify water when it is brought into contact with tap water.

In the water activation apparatus 1 thus constructed, water (indicated by W in FIG. 1) flows from the inlet port 23A of the housing 2 and collides with the upstream canopy 6 held by the first-stage holder 3A to spread and accelerate. As a result, the water forms a number of vortex flows at the edge 62 of the foot of the upstream canopy 6. At that time, when the flow of water collides with the upstream canopy 6, catalysis of a titanium alloy suppresses proliferation of bacteria in the water and ionizes chlorine to detoxify the water as the upstream canopy 6 is formed of a titanium alloy. In this case, an effect of improving the qualify of the flowing water can be expected. Trihalomethane generated by reaction of organic substances such as chloramine (nitrogen compound) and humic substances with chlorine is expected to be reduced. Examples of bacteria suppressed in proliferation include *Escherichia coli* and *Legionella pneumophilia*.

The flow of water that has passed through the upstream canopy 6 and reached the holding portion 30 of the holder 3A passes through the water flow holes 35. At that time, the water flow is swirled into swirled vortex flows by the inclined surfaces of the radial ribs 33 and the concentric ribs 34. Thus, the water flow is stirred in a wide variety of directions into a turbulence state. The water flow in the turbulence state collides with the water activation members 7 held by the holding portions 30 of the second-stage and third-stage holders 3B and 3C and passes through between the water activation members 7. At that time, each of the water activation members 7 rotates about its axis by the water flowing through the spiral grooves 71 and 72 as the water activation members 7 do not contact each other. The flow of water swirls along the spiral grooves 71 and 72. The flow of water swirling along the spiral grooves 71 and 72 of the water activation members 7 is subjected to ion beams, magnetic beams, far infrared rays, or a trace of various kinds of radiations by the functional mineral of the water activation members 7.

The swirling flow of water generated by contact with the water activation members 7 is provided with further stirring by the inclined surfaces of the radial ribs 33 and the concentric ribs 34 of the holding portions 30, resulting in an enhanced turbulence state. The flow of water flows from the third-stage holder 3C into the vane member 4. The flow of water that has flowed from the third-stage holder 3C to the vane member 4 swirls about the shaft portion 41 by the aforementioned swirl vanes 42 of the vane member 4 and flows into the water activation module 5. The swirling flow of water contacting the swirl vanes 42 of the vane member 4 is subjected to ion beams, magnetic beams, far infrared rays, or a trace of various kinds of radiations by the functional mineral of the vane member 4.

The water flow that has flowed to the water activation module 5 passes through the ball cases 55 of the water activation ball members 53 inside of the honeycomb mesh portion 52 and contacts the balls 56. Thus, the flow of water is subjected to ion beams, magnetic beams, far infrared rays, or a trace of various kinds of radiations by the functional mineral of the balls 56. Furthermore, water communicates between the inner side and the outer side of the corrugated pipe 51 through the liquid passage holes 51A of the corrugated pipe 51, thereby stirring the water.

The water flow exiting the water activation module 5 is provided with further stirring by the inclined surfaces of the radial ribs 33 and the concentric ribs 34 of the holding portions 30 in the fourth-stage holder 3D, resulting in an enhanced turbulence state. Then the water flow collides with the downstream canopies 8 held by the last-stage holder 3E. At that time, the flow of water is divided and accelerated by a plurality of downstream canopies 8. Furthermore, fine vortex flows generated at the edges 80 of the foot of the respective downstream canopies 8 are added to the flow of water. At that time, when the flow of water collides with the downstream canopies 8, catalysis of a titanium alloy suppresses proliferation of bacteria in the water and ionizes chlorine to detoxify the water as the downstream canopies 8 are formed of a titanium alloy.

The flow of water that has passed through the downstream canopies 8 and reached the holding portion 30 of the holder 3E is swirled into swirled vortex flows by the inclined surfaces of the radial ribs 33 and the concentric ribs 34 when it passes through the water flow holes 35. Then the flow of water exits the outlet port 24A.

As described above, the flow of water that has passed through the water activation apparatus 1 is not only suppressed in proliferation of bacteria (*Escherichia coli* and *Legionella pneumophilia*) by resonance between the canopies 6 and 8 having two types of shapes and catalysis of the canopies 6 and 8, but also lowered in hardness (from 110 to 20). Furthermore, hydrogen bonding groups (clusters) of water molecules of the water flow are fragmented by far infrared rays from the water activation members 7 and the balls 56 of the water activation ball members 53. At the same time, electrons are generated by friction between water molecules, so that the water flow is made reductive (brought into an activated state). Furthermore, the arrangement of the water activation members 7, the holders 3, the vane member 4, and the water activation module 5 generates various types of turbulence in which a plurality of vertex flows are deflected inward or outward, resulting in efficient stirring effects. Thus, generation of negative charges is amplified as much as possible, thereby further enhancing activation effects.

Furthermore, the inner cylindrical body 20 and the outer cylindrical body 22 of the housing 2 are electrically isolated from each other, so that the water activation apparatus 1 serves as an electric double layer capacitor. Therefore, electrons generated in an internal space of the inner cylindrical body 20 are prevented from attracting positive charges from an exterior of the housing 2 so as to inhibit water activation effects. Electric erosion of the water activation apparatus 1 or the like is also prevented.

The numbers of the aforementioned holders 3, water activation members 7, vane member 4, upstream canopy 6, and downstream canopies 8 in the present embodiment are not limited to the illustrated examples and can be selected arbitrarily in consideration of the viscosity, the flow rate, the flow velocity, and the efficiency of water activation of the water flow.

The aforementioned embodiment describes a water activation apparatus that uses water as a liquid to be allowed to pass through a liquid activation apparatus. A liquid activation apparatus according to the present invention is also applicable to cases where any liquid other than water passes through a liquid activation apparatus. For example, as described below, a liquid activation apparatus according to the present invention may be configured such that water-soluble cutting oil used in a machine tool or the like, or a mixture of such oil and water passes therethrough to activate the liquid such as cutting oil. As used herein, the term "cutting oil" refers not only to oil, but also to water contained in cutting oil if the cutting oil contains water.

Figure 12:
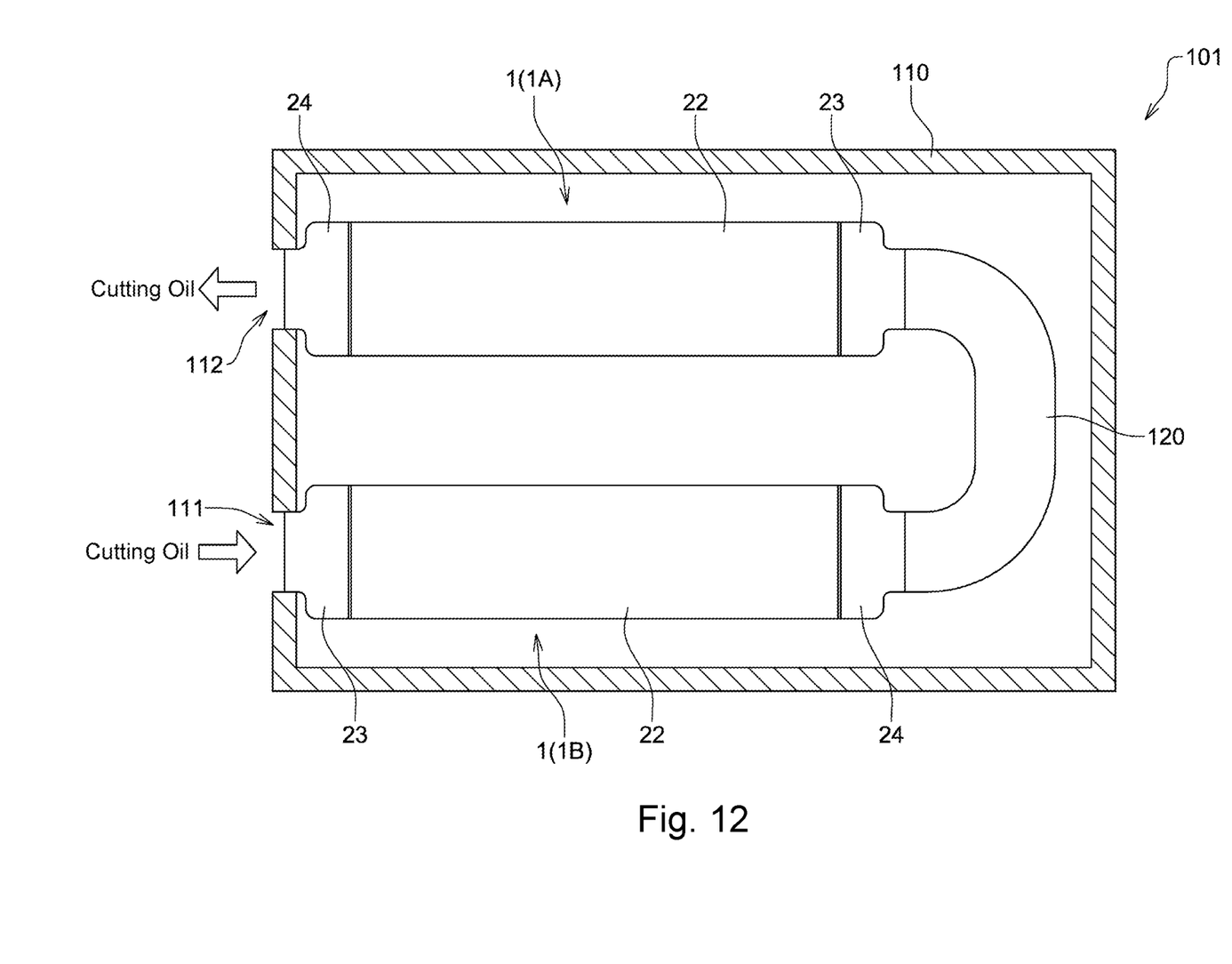
FIG. 12 is a schematic diagram showing an arrangement of a liquid activation system including the liquid activation apparatuses as illustrated in FIG. 1.

FIG. 12 is a schematic diagram showing a liquid activation system 101 including liquid activation apparatuses (water activation apparatuses 1) as illustrated in FIG. 1. For example, this liquid activation system 101 can be used to activate water-soluble cutting oil. The liquid activation system 101 has a housing 110, two liquid activation apparatuses 1 (1A, 1B) as described above that are housed in the housing 110, and an elbow 120 connecting an outlet connecting pipe 24 of the upstream liquid activation apparatus 1A and an inlet connecting pipe 23 of the downstream liquid activation apparatus 1B to each other. An inlet connecting pipe 23 of the upstream liquid activation apparatus 1A is connected to an inlet port 111 of the housing 110, and an outlet connecting pipe 24 of the downstream liquid activation apparatus 1B is connected to an outlet port 112 of the housing 110.

With this configuration, cutting oil (including a liquid mixture of water and cutting oil) is introduced into the liquid activation apparatus 1A from the inlet connecting pipe 23 of the liquid activation apparatus 1A, which is connected to the inlet port 111 of the housing 110. Thus, the cutting oil passes through the liquid activation apparatus 1A. The cutting oil that has passed through the liquid activation apparatus 1A is introduced into the liquid activation apparatus 1B from the inlet connecting pipe 23 of the liquid activation apparatus 1B through the elbow 120. Thus, the cutting oil passes through the liquid activation apparatus 1B. The cutting oil that has passed through the liquid activation apparatuses 1A and 1B is discharged from the outlet connecting pipe 24 of the liquid activation apparatus 1B, which is connected to the outlet port 112 of the housing 110.

When cutting oil passes through the aforementioned liquid activation apparatuses 1 in this manner, negative ions in the cutting oil increase due to effects of functional minerals within the liquid activation apparatuses 1. Therefore, oxidation of the cutting oil is suppressed, and performance of the cutting oil is prevented from being deteriorated. Accordingly, cutting oil can be reused multiple times when the cutting oil is circulated through the liquid activation system 101. Additionally, odor of the cutting oil can be suppressed, and the cutting oil can have a rust-proof function. A liquid to be introduced into the liquid activation system 101 is not limited to cutting oil, and other liquids may be introduced into the liquid activation system 101.

As described above, according to an aspect of the present invention, there is provided a liquid activation apparatus capable of generating a liquid that can maintain a high active power for a long period of time. The liquid activation apparatus has an electrically conductive inner cylindrical body, an electrically conductive inlet connecting pipe having an inlet port formed therein, the inlet connecting pipe being connected to the inner cylindrical body, an electrically conductive outlet connecting pipe having an outlet port formed therein, the outlet connecting pipe being connected to the inner cylindrical body, an electrically conductive outer cylindrical body disposed outside of the inner cylindrical body, the outer cylindrical body being electrically isolated from the inner cylindrical body, the inlet connecting pipe, and the outlet connecting pipe, a corrugated pipe disposed inside of the inner cylindrical body, a honeycomb mesh portion disposed inside of the corrugated pipe, and a plurality of liquid activation ball members filled radially inward of the honeycomb mesh portion. Each of the plurality of liquid activation ball members includes a case having a closed-shell cavity structure and a ball housed within the case, the ball containing one or more types of functional minerals capable of emitting an ion beam, a magnetic beam, a far infrared ray, or a trace of radiation.

The honeycomb mesh portion may preferably be formed of a mesh member in which a first mesh layer having a first honeycomb structure and a second mesh layer having a second honeycomb structure located at a position offset from the first honeycomb structure are bonded to each other.

The corrugated pipe may preferably have a liquid passage hole formed therein that communicates between an inside and an outside of the corrugated pipe. Furthermore, the corrugated pipe may preferably contain one or more types of functional minerals capable of emitting an ion beam, a magnetic beam, a far infrared ray, or a trace of radiation.

The case of the liquid activation ball member may be formed of two case parts having a plurality of projections arranged at predetermined intervals and a plurality of projection receivers arranged at same intervals as the predetermined intervals. In this case, the projection receivers of the case parts may be arranged in a middle of adjacent ones of the projections.

The water activation apparatus may further have a vane member arranged inside of the inner cylindrical body to cause a swirling flow to a liquid flowing in an axial direction. The vane member may contain one or more types of functional minerals capable of emitting an ion beam, a magnetic beam, a far infrared ray, or a trace of radiation.

The liquid may comprise water or water-soluble oil.

Although some preferred embodiments of the present invention have been described, the present invention is not limited to the aforementioned embodiments. It should be understood that various different forms may be applied to the present invention within the technical idea thereof.

This application claims the benefit of priority from Japanese patent application No. 2021-014187, filed on Feb. 1, 2021, the disclosure of which is incorporated herein in its entirety by reference.

INDUSTRIAL APPLICABILITY

The present invention is suitably used for a liquid activation apparatus for bringing water or oil into a so-called activated state.

DESCRIPTION OF REFERENCE NUMERALS AND SIGNS

1 Water activation apparatus (liquid activation apparatus)
2 Housing
3 (3A-3E) Holder
4 Vane member
5 Water activation module
6 Upstream canopy
7 Water activation member
8 Downstream canopy
20 Inner cylindrical body
21 Insulator
22 Outer cylindrical body
23 Inlet connecting pipe
23A Inlet port
24 Outlet connecting pipe
24A Outlet port
25 Insulation ring
30 Holding portion
31 Connecting shaft
32 Circumferential wall
33 Radial rib
34 Concentric rib
35 Water flow hole
40 Ring portion
41 Shaft portion
42 Swirl vane
43 Projection
50 Outer pipe
51 Corrugated pipe
51A Liquid passage hole
52 Honeycomb mesh portion
52A, 52B Mesh layer
53 Water activation ball member (liquid activation ball member)
54 Mesh member
54A First mesh layer
54B Second mesh layer
55 Case
56 Ball
57 Joint portion
70 Through hole
71, 72 Spiral groove
90 Case part
91 Projection
92 Projection receiver
101 Liquid activation system

The invention claimed is:
1. A liquid activation apparatus comprising:
an electrically conductive inner cylindrical body;
an electrically conductive inlet connecting pipe having an inlet port formed therein, the inlet connecting pipe being connected to the inner cylindrical body;
an electrically conductive outlet connecting pipe having an outlet port formed therein, the outlet connecting pipe being connected to the inner cylindrical body;
an electrically conductive outer cylindrical body disposed outside of the inner cylindrical body, the outer cylin- drical body being electrically isolated from the inner cylindrical body, the inlet connecting pipe, and the outlet connecting pipe;

a corrugated pipe disposed inside of the inner cylindrical body;

a honeycomb mesh portion disposed inside of the corrugated pipe; and a plurality of liquid activation ball members filled radially inward of the honeycomb mesh portion, wherein each of the plurality of liquid activation ball members includes:

a case having a closed-shell cavity structure, and a ball housed within the case, the ball containing one or more types of functional minerals capable of emitting an ion beam, a magnetic beam, a far infrared ray, or a trace of radiation.

2. The liquid activation apparatus as recited in claim 1, wherein the honeycomb mesh portion comprises a mesh member in which a first mesh layer having a first honeycomb structure and a second mesh layer having a second honeycomb structure located at a position offset from the first honeycomb structure are bonded to each other.

3. The liquid activation apparatus as recited in claim 1, wherein the corrugated pipe has a liquid passage hole formed therein that communicates between an inside and an outside of the corrugated pipe.

4. The liquid activation apparatus as recited in claim 1, wherein the corrugated pipe contains one or more types of functional minerals capable of emitting an ion beam, a magnetic beam, a far infrared ray, or a trace of radiation.

5. The liquid activation apparatus as recited in claim 1, wherein the case of the liquid activation ball member is formed of two case parts having a plurality of projections arranged at predetermined intervals and a plurality of projection receivers arranged at same intervals as the predetermined intervals.

6. The liquid activation apparatus as recited in claim 5, wherein the projection receivers of the case parts are arranged in a middle of adjacent ones of the projections.

7. The liquid activation apparatus as recited in claim 1, further comprising a vane member arranged inside of the inner cylindrical body to cause a swirling flow to a liquid flowing in an axial direction, the vane member containing one or more types of functional minerals capable of emitting an ion beam, a magnetic beam, a far infrared ray, or a trace of radiation.

8. The liquid activation apparatus as recited in claim 1, wherein the liquid comprises water.

9. The liquid activation apparatus as recited in claim 1, wherein the liquid comprises water-soluble oil.

* * * * *